United States Patent [19]

Sugimoto

[11] Patent Number: 4,638,693
[45] Date of Patent: Jan. 27, 1987

[54] BAR STOCK FEEDER
[75] Inventor: Kenji Sugimoto, Tokorozawa, Japan
[73] Assignee: Citizen Watch Co., Ltd., Tokyo, Japan
[21] Appl. No.: 645,670
[22] Filed: Aug. 30, 1984
[30] Foreign Application Priority Data
  Sep. 27, 1983 [JP] Japan .................. 58-179005
[51] Int. Cl.⁴ ............... B26D 13/02; B26D 13/04
[52] U.S. Cl. ............................... 82/2.5; 82/2.7; 414/14
[58] Field of Search ............ 82/2.5, 2.7; 414/14, 414/17, 18

[56] References Cited
U.S. PATENT DOCUMENTS
3,612,298 10/1971 Azuma .................... 414/18
3,812,983 5/1974 Wanner et al. .......... 82/2.7
3,945,506 3/1976 Scheurer .................. 82/2.7

FOREIGN PATENT DOCUMENTS
443048 2/1936 United Kingdom ........ 414/18

*Primary Examiner*—Leonidas Vlachos
*Attorney, Agent, or Firm*—Birch, Stewart, Kolasch & Birch

[57] ABSTRACT

A bar stock feeder for an automatic lathe, comprises a cover tube provided adjacent a rear side of a spindle of the automatic lathe, and a rod guide tube is provided in the cover tube. A push rod is slidably mounted in the rod guide tube in order to feed a bar stock to the lathe. The push rod is moved by a chain driven by sprocket wheels. Lubricating oil is supplied to the rod guide tube for preventing the vibration of the bar stock during the machining operation.

7 Claims, 14 Drawing Figures

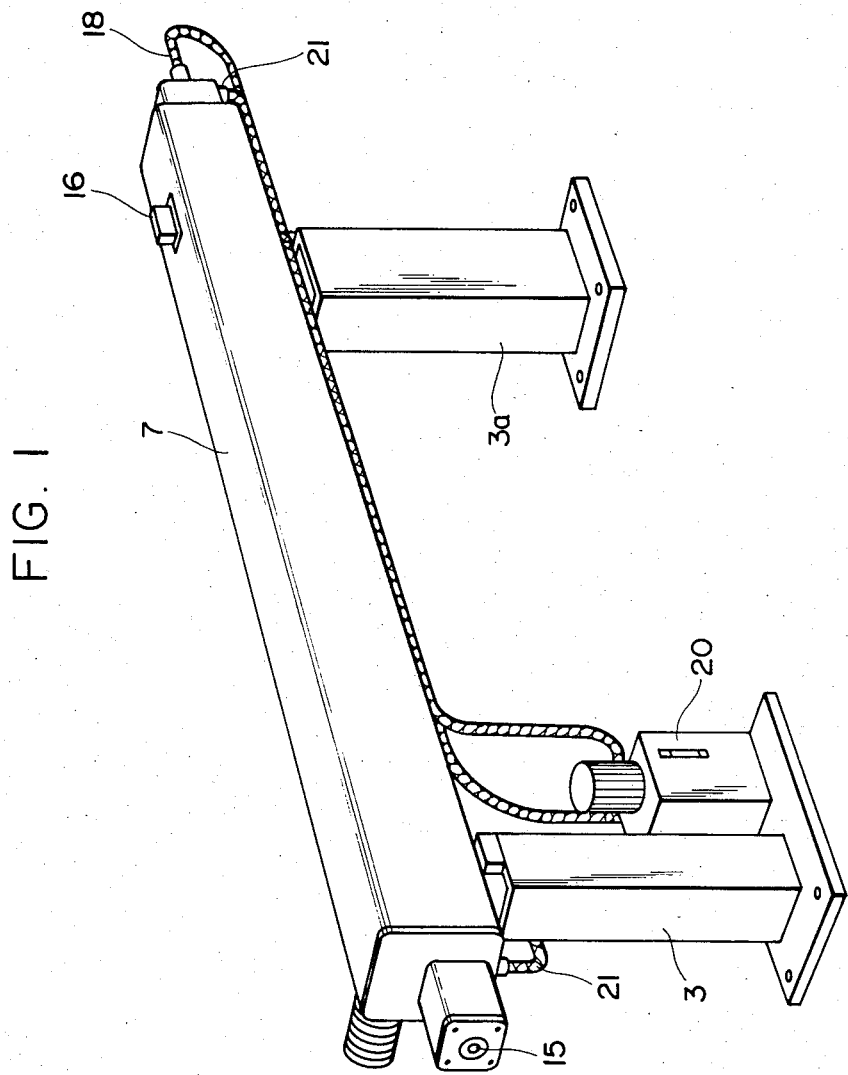

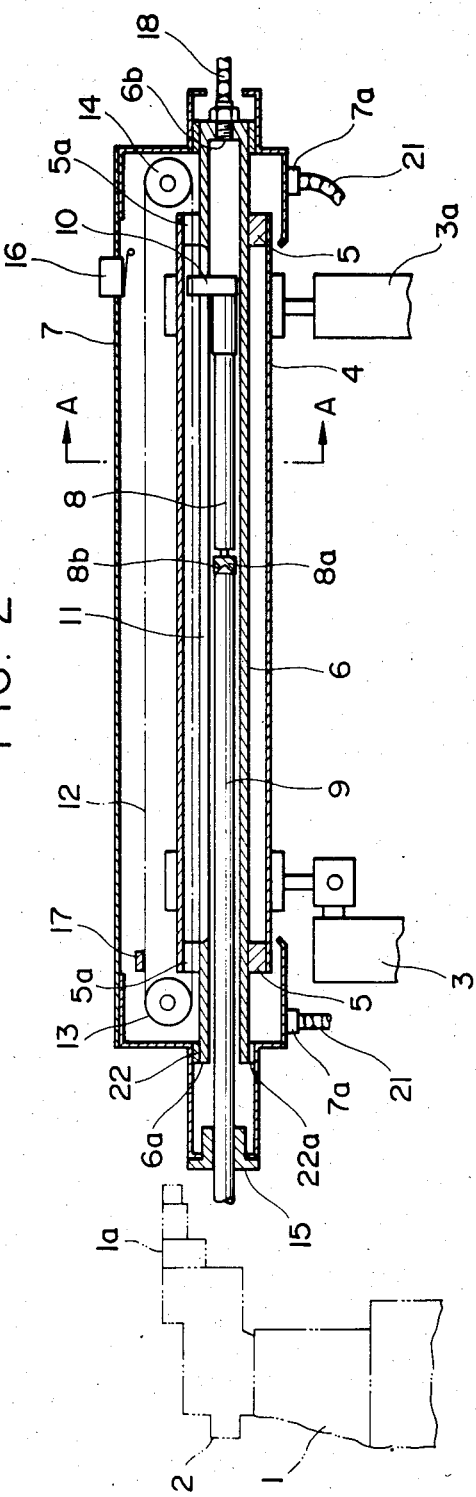
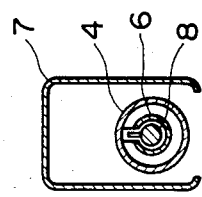

FIG. 4

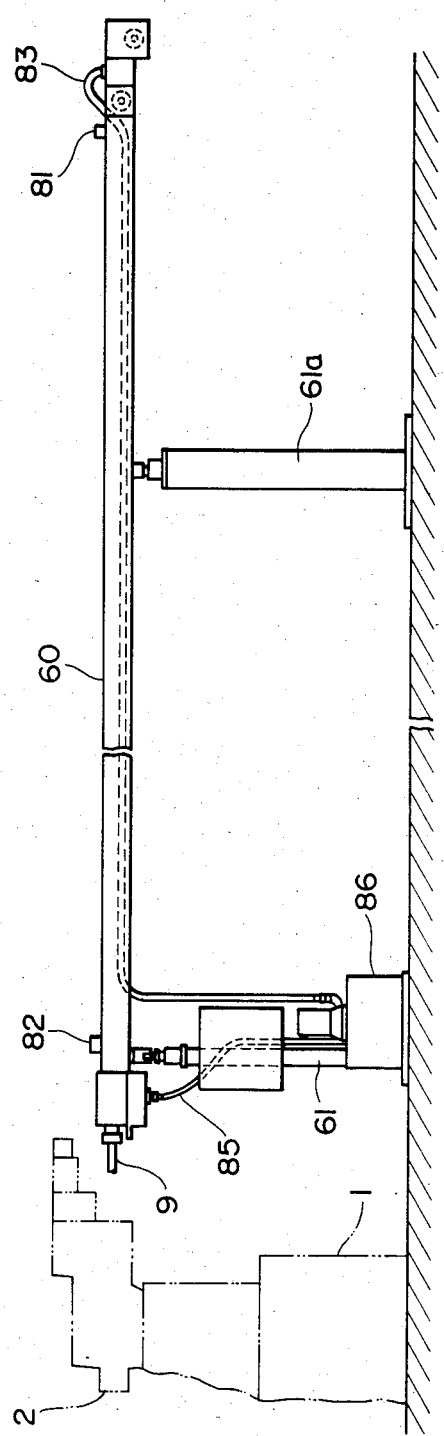

BAR STOCK FEEDER

BACKGROUND OF THE INVENTION

The present invention relates to a bar stock feeder for a processing machine such as an automatic lathe and more particularly to a bar feeder for automatically feeding a bar into an axial hole formed in a spindle of an automatic lathe.

In an automatic lathe, especially in an automatic screw machine having a hollow spindle, a bar as a work is loaded from the rear end of the spindle and mounted in a collet. After machining operation, a machined portion of the bar is cut off by a cut-off tool to get a product. Subsequently, the cut-off tool is withdrawn and the bar is advanced a predetermined length necessary to the next machining. Accordingly, it is indispensable to provide an automatic lathe with a bar feeder for automatically feeding the bar.

A conventional bar feeder has a rod guide tube in which a push rod is slidably mounted for feeding a bar to a lathe. The bar is also rotated together with the spindle of the lathe. When the bar rotates at high speed, the bar vibrates in the rod guide tube and strikes the inner wall of the tube, causing the generation of loud noise. Further, damages, such as dent, scratch, crack and others, to the outer periphery of the bar are caused by the striking.

In order to solve these problems, the inner wall of the rod guide tube is lined with soft metal such as lead. However, lining work with lead for the inner wall is very difficult and expensive.

SUMMARY OF THE INVENTION

An object of the present invention is to provide a bar feeder which may prevent a bar stock from clanging against an inside wall of a rod guide tube and prevent the damage to the bar stock during the operation.

Another object of the present invention is to provide a bar feeder having a high operability for machining of bars and made at low cost.

According to the present invention, there is provided a bar stock feeder for a processing machine having a hollow spindle comprising: a cover tube provided adjacent said hollow spindle; a rod guide tube provided in said cover tube and having a front end opening for passing a bar stock and a longitudinal slit; an elongated flexible member provided to be moved along said rod guide tube in the longitudinal direction; guide means for guiding said elongated flexible member; a push rod slidably mounted in said rod guide tube; a flag for operatively connecting said push rod to said elongated flexible member through said slit; means for moving said elongated flexible member to advance said push rod; lubricating oil passage means from an inlet to an outlet passing through said rod guide tube and cover tube; and lubricating oil supply means for supplying lubricating oil to said rod guide tube passing through said passage means.

In accordance with a further feature of the present invention, the push rod has a rotary push member rotatably mounted in the front end of the push rod so as to be rotated together with a bar stock, the elongated flexible means comprises a chain, said guide member is a pair of sprocket wheels engaged with the chain, and said means is an electric motor.

The bar stock feeder according to the present invention is further provided with a cover for covering said cover tube and rod guide tube, and said chain and sprocket wheels are provided in the cover. The chain and sprocket wheels may be provided in the cover tube.

In another aspect of the present invention, the cover tube rotatably supports a rod guide tube assembly which comprises a plurality of rod guide tubes each being supported by a pair of rotary members at both ends thereof. The rotary members are rotatably supported in the cover tube. A drive means is provided for indexing the rod guide tube assembly so as to position each rod guide tube to a feeding position, and an engaging member is secured to the chain so as to engage with the flag at the feeding position.

These and other objects and features of the present invention will become more apparent from the following description with reference to the accompanying drawings.

BRIEF DESCRIPTION OF THE DRAWINGS

FIG. 1 is a perspective view of a bar stock feeder according to the present invention;

FIG. 2 is an axial section showing a main part of the bar feeder of FIG. 1;

FIG. 3 is a cross-sectional view taken along a line A—A of FIG. 2;

Figure 4:
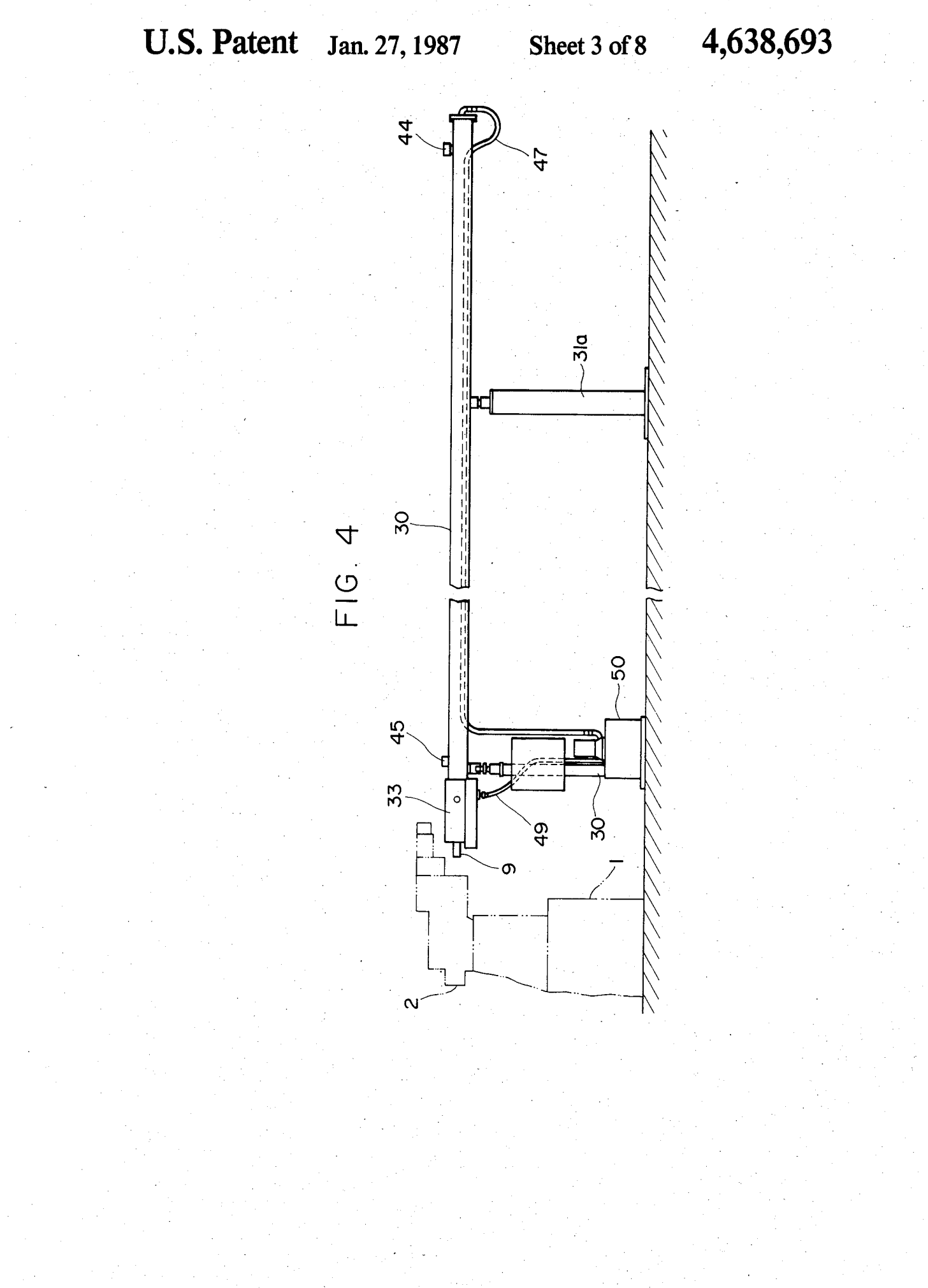

FIG. 4 is a side elevational view showing a second embodiment of the present invention;

FIG. 8 is a side elevational view showing a third embodiment of the present invention;

DESCRIPTION OF THE PREFERRED EMBODIMENT

Figure 5:
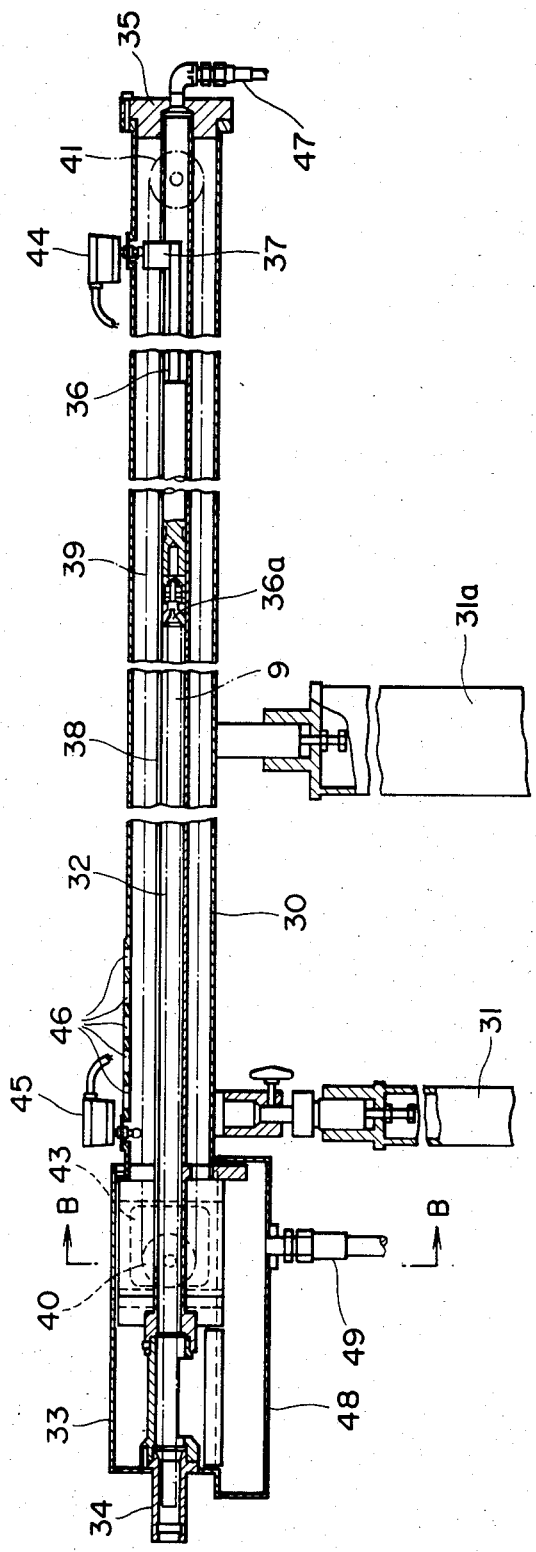
FIG. 5 is a sectional view showing a part of the bar feeder of FIG. 4.
Figure 6:
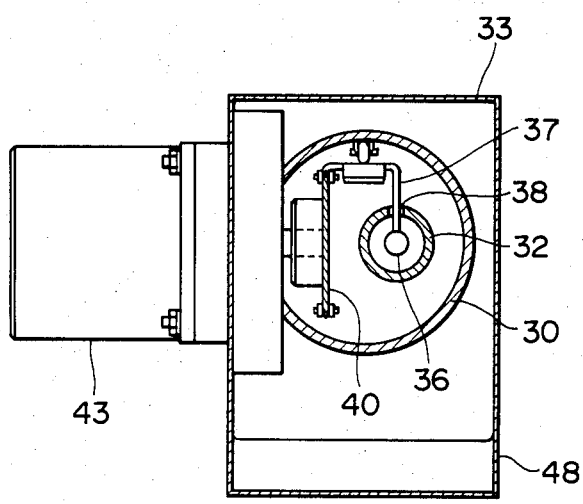
FIG. 6 is an enlarged sectional view taken along a line B—B of FIG. 5.
Figure 7:
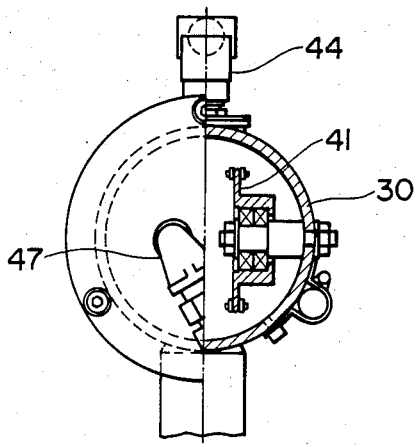
FIG. 7 shows the rear end of a cover tube, a part of which is broken away.

Referring to FIGS. 1 to 3, a bar stock feeder according to the present invention is disposed adjacent the rear portion of a spindle head 1a of an automatic lathe 1. The bar feeder comprises a cover tube 4 supported on supports 3, 3a and a rod guide tube 6 mounted in the cover tube 4 interposing bushes 5. The rod guide tube 6 is disposed in alignment with a hollow spindle 2 of the automatic lathe 1. Both end portions of the rod guide tube 6 project from the cover tube 4, and a cover 7 is fixed to the projected end portions of the rod guide tube 6 for covering those components. The rod guide tube 6 has a front end opening 6a and has a push rod 8 slidably provided therein. Rotatably secured to an end of the push rod 8 is a rotary push member 8a which has a conical recess 8b. The conical recess 8b is engaged with a conical rear end of a bar 9. The engagement of the conical recess 8b with the conical rear end of the bar 9 ensures the engagement upon loading and feeding of the bar. A flag 10 is secured to a rear end of the push rod 8 to upwardly project from the rod guide tube 6 passing through a slit 11 which is longitudinally formed on an upper portion of the rod guide tube 6. The flag 10 is secured to an endless chain 12 which engages with a pair of sprocket wheels 13 and 14 rotatably supported on the cover 7, respectively. A front sporcket wheel 13 is driven by a torque motor (not shown) at a constant torque to move the push rod 8.

The cover 7 has a guide bush 15 provided on the front end thereof for rotatably supporting the bar 9. A limit switch 16 is provided on an upper and rear end portion of the cover 7 so as to be operated by a dog 17 secured to the chain 12 when the length of the residual portion of the bar becomes lower than a predetermined value.

A supply pipe 18 for supplying lubricating oil is connected to an inlet 6b at the rear end of the rod guide tube 6 and a pair of drain pipes 21 are connected to outlets 7a provided at lower portions of both ends of the cover 7. The lubricating oil supplied by a lubricating oil pump 20 flows into the rod guide tube 6 through the supply pipe 18. The lubricating oil in the rod guide tube 6 overflows and enters into the cover 7 through slit 11, a hole 5a provided in the bush 5 for the chain 12, or through a space between the end of the rod guide tube 6 and the bar 9 and a hole 22a formed in an end bush 22 and returns to the pump 20 through drain pipes 21. The pump 20 is adapted to supply the oil so as to fill the rod guide tube 6 with the oil at a very low pressure.

A forward end portion of the bar 9 loaded in the automatic lathe 1 is clamped in a collet mounted on the spindle 2. After machining operation, the bar is cut off with a cut-off tool to get a product. At that time, the cut end face of the bar is abutted on the side of the cut-off tool and the collet is opened. Then, the spindle head 1a is rearwardly moved a predetermined length and the collet grips the bar. After the withdraw of the cut-off tool, the spindle head is advanced the predetermined length. Accordingly, the bar is fed to the machining position by the movement of the spindle head and push rod 8 is advanced by the chain 12 following the bar.

As the bar 9 is fed by the push rod 8, the dog 17 on the chain 12 is moved to the right. When the residual portion of the bar 9 in the spindle 2 becomes such a short length that no more machining operation is permissible, the dog 17 engages with an actuating rod of the limit switch 16 to operate it to indicate the necessity of exchange of the bar for a new one. Then, the residual bar is manually or automatically taken out from the forward or rear end of the spindle 2.

This bar feeder is adapted to be swiveled about the support 3a so that a front portion of the bar feeder supported on the support 3 is removed from the lathe 1. Then, another bar is loaded into the rod guide tube 6 from the front end opening of the bar feeder.

The lubricating oil is continuously fed into the rod guide tube 6 through the supply pipe 18 and the oil in the tube 6 overflows from the end portion or the slit 11 of the tube 6. When the bar is rotating, the lubricating oil serves as a lubricant and a damper between the bar 9 and the rod guide tube 6 so that damages to the outer periphery of the bar and generation of noisy sound can be prevented. The cover tube 4 is filled with the oil, so that the noise is further reduced by the oil in the cover tube 4.

Referring to FIGS. 4 to 7 showing a second embodiment of the present invention, the bar feeder comprises a cover tube 30 supported on supports 31, 31a, a rod guide tube 32 mounted in the cover tube 30, and a cover 33 secured to the cover tube 30 at the front portion thereof. A front end portion of the rod guide tube 32 is projected into the cover 33 and connected to a tube member 34 an end portion of which is projected from the cover 33. The rear end of the rod guide tube 32 is closed by a lid 35.

Although a push rod 36 slidably provided in the rod guide tube 32 has a conical recess 36a, a chuck may replace the recess for clamping the bar 9. A flag 37 having an L-shaped section is secured to a rear end portion of the push rod 36 so as to project through a slit 38 longitudinally formed on the rod guide tube 32. An end portion of the flag 37 is secured to an endless chain 39 which engages with a pair of sprocket wheels 40 and 41. The front sprocket wheel 40 is rotatably supported in the cover 33 and rear sporcket wheel 41 is rotatably supported in the cover tube 30. The front sprocket 40 is driven by a torque motor 43 at a constant torque to move the push rod 36 forwards.

A pair of limit switches 44, 45 are provided on the cover tube 30. The limit switch 44 is provided for a contact with the flag 37 when the bar 9 is fully loaded in the rod guide tube 32. The other limit switch 45 is provided for the contact with the flag 37 when the length of the residual portion of the bar 9 becomes short less than a predetermined length. A plurality of holes 46 for attaching the switch 45 are formed on the cover tube 30 so as to change the position of the switch. The position is decided by the length of the residual bar which varies with the variation of the length of a work to be machined.

A supply pipe 47 for supplying lubricating oil is secured to the lid 35 to communicate with the rod guide tube 32. The lubricating oil fed to the tube 32 overflows to the cover tube 30 through the slit 38. Then, the oil flows into an oil pan 48 provided on the underside of the cover 33 and returns to an oil pump 50 through a drain pipe 49.

In accordance with this second embodiment, a chain and sprocket device, serving as a push rod driving device is provided in the cover tube 30. Accordingly, a cover corresponding to the cover 7 in the first embodiment is omitted. Thus, the construction of the bar feeder is simplified. Other functions and advantages are the same as the first embodiment.

FIGS. 8 to 12 shows a third embodiment of the present invention. The bar feeder of the embodiment comprises a plurality of rod guide tubes in order to continuously feed a plurality of bar stocks. The bar feeder comprises a cover tube 60 supported on supports 61, 61a, a cover 62 provided on a front portion of the bar feeder and secured to a front end portion of the cover tube 60, and eight rod guide tubes 63 provided in the cover tube 60. Each rod guide tube 63 is secured to rotary members 64 and 65 at both ends thereof. The front rotary member 64 is rotatably mounted in a supporting member 64a provided in the cover 62, and a rear rotary member 65 is rotatably mounted in a cylindrical supporting member 88 secured to the cover tube 60.

Figure 10:
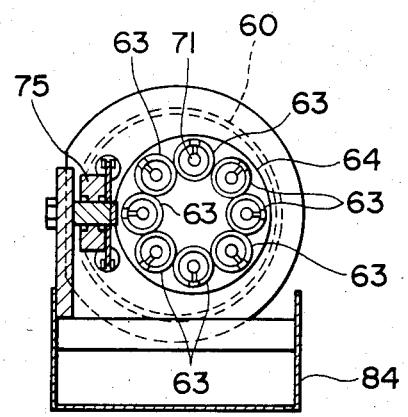
FIG. 10 is a sectional view taken along a line C—C of FIG. 9.
Figure 11:
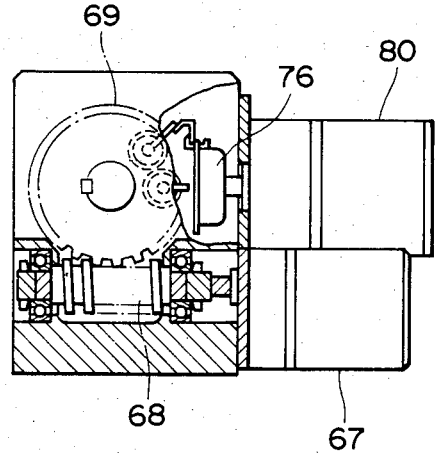
FIG. 11 is a sectional view taken along a line D—D of FIG. 9.
Figure 9:
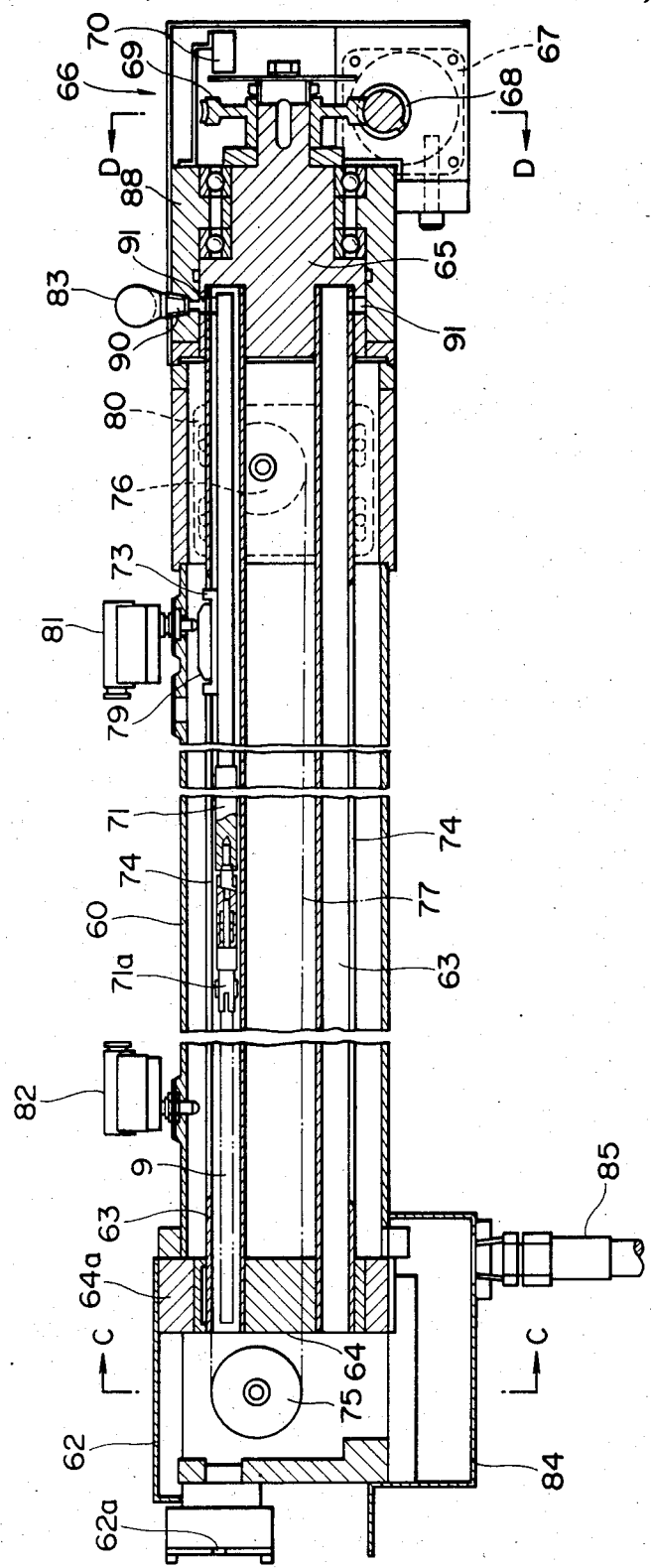
FIG. 9 is a sectional view showing a part of the bar feeder of FIG. 8.

As shown in FIG. 10, rod guide tubes 63 are angularly equispaced on a circle about the rotation center of the rotary members 64 and 65. The rear end of the rotary member 65 is operatively connected to a drive means 66. The drive means 66 comprises a drive motor 67, a worm 68 secured to the shaft of motor 67 and a worm wheel 69 secured to the rotary member 65. A position detector 70 is provided to detect the angular position of the rotary member 65 and to produce a signal which is applied to a drive control circuit (not shown) for controlling the motor 67.

A push rod 71 slidably provided in each of rod guide tubes 63 has a chuck 71a rotatably mounted in the front end thereof for clamping a rear end of the bar 9. A flag 73 provided on the other end of each push rod 71 is projected from the guide tube 63 passing through a longitudinal slit 74.

A chain 77 is engaged with a sprocket wheel 75 supported in the cover 62 and with a sprocket wheel 76 supported in cover tube 60. A torque motor 80 is operatively connected to the sprocket wheel 76 for feeding the bar to the automatic lathe 1. The chain 77 has an engaging member 79 adapted to be engaged with a recess 78 of the flag 73. The cover tube 60 has a pair of limit switches 81, 82 for detecting the positions of the push rod 71 and the bar 9.

A supply pipe 83 is connected to a passage 90 formed in an upper portion of the supporting member 88. The passage 90 is adapted to be communicated with a passage provided for for every guide tube for supplying lubricating oil to each tube 63. The lubricating oil overflows from the slit 74 of each tube 63 to an oil pan 84 mounted on the underside of the cover 62 and cover tube 60 and returns to an oil pump 86 through a drain pipe 85 connected to the oil pan 84.

Figure 12A:
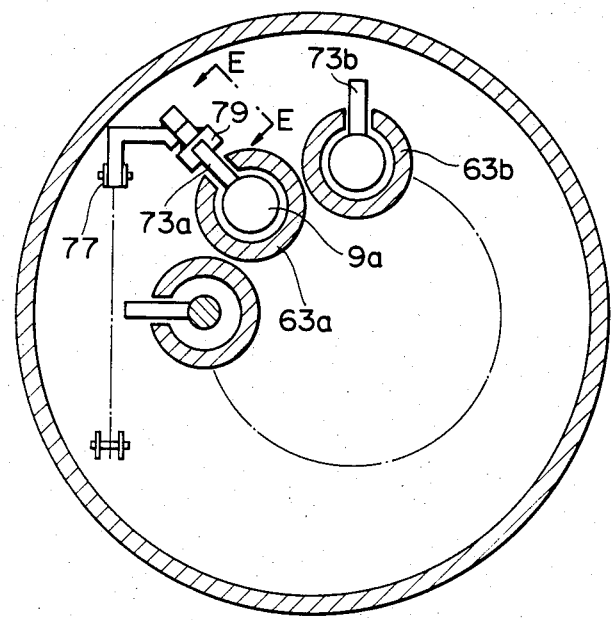
FIG. 12(a) is a schematic sectional view showing a structure of a rod guide tube and an engaging member.
Figure 12B:
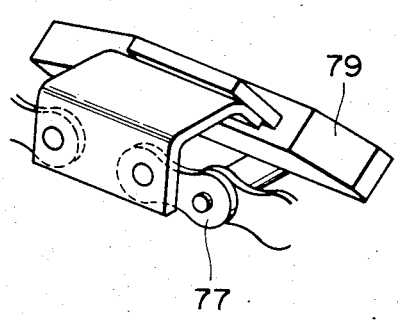
FIG. 12(b) is a perspective view of the engaging member.
Figure 12C:
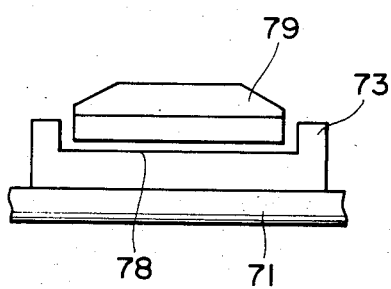
FIG. 12(c) is a schematic side view of the engaging member and a flag in engaged state, as viewed along an arrow E—E of FIG. 12(a).

In operation, firstly, the rod guide tube assembly comprising rod guide tubes 63 and rotary members 64 and 65 is successively indexed by the drive means 66. A bar stock 9 is loaded in each of eight rod guide tubes 63 through an opening 62a provided in the front side of the cover 62 at the every indexed position. Thus, each push rod 71 is located in the innermost position in the guide tube 63. When the loading finishes, one 63a of rod guide tubes 63 is positioned at the operating position for feeding the bar, where the engaging member 79 is engaged with the flag 73a, as shown in FIG. 12(a). By starting the motor 80, the push rod 71 and bar stock 9a are advanced by chain 77. When the residual bar becomes a predetermined length, limit switch 82 is operated by the engaging member 79 to stop the motor 80. A signal from the switch 82 is applied to the motor 80 through the control circuit so that the sprocket wheel 76 is rotated in the clockwise direction to withdraw the push rod 71 to the innermost position. While the residual bar of the bar 9 is taken out from the spindle 2 and discharged. At the position, switch 81 is operated by the engaging member 79 to produce a signal, so that the drive motor 67 is started to index the rod guide tube assembly one pitch. Thus, the next guide tube 63 is positioned to the operational position, and the engaging member 79 is removed from the flag 73a and engaged with the flag 73b of the guide tube 63b. At that time, position detector 70 detects the indexed position to produce a signal which causes the motor 80 to start to feed the bar stock. Thereafter, the same feeding operation is repeated.

A positioning device comprising a positioning pin, means for projecting the pin and for engaging it with one of positioning recesses provided on the periphery of the cover tube 60 may be provided to ensure the position of the rod guide tube 63 for the feeding.

In accordance with the third embodiment, the feeder is adapted to store a plurality of bar stocks and to successively feed bar stocks. Thus, operability of the bar feeder can be remarkably improved.

From the foregoing, it will be understood that the present invention provides a bar stock feeder which may prevent the generation of noise during the machining operation and prevent damages to the bar stock by the collision of the bar with a rod guide tube.

In stead of chain and sprocket wheels, another flexible member such as a wire, plastic belt, or nylon string can be employed. Further, a weight may be used for moving a flexible member so as to advance the push rod.

While the invention has been described in conjunction with preferred specific embodiments thereof, it will be understood that this description is intended to illustrate and not limit the scope of the invention, which is defined by the following claims.

What is claimed is:

1. A bar stock feeder for a processing machine having a hollow spindle, comprising:
    first support means;
    cover means provided adjacent said hollow spindle and pivotally supported by said first support means;
    second support means;
    at least one rod guide tube supported by said second support means in said cover means and having a front end opening for passing a bar stock and a longitudinal slit;
    an elongated flexible member provided to be moved along said rod guide tube in the longitudinal direction;
    guide means for guiding said elongated flexible member;
    a push rod slidably mounted in said rod guide tube;
    a flag for operatively connecting said push rod to said elongated flexible member through said slit;
    means for moving said elongated flexible member to advance said push rod;
    said cover means being for covering the entirety of the rod guide tube, flexible member, guide means, and flag;
    lubricating oil passage means from an inlet formed in a rear portion of the rod guide tube to an outlet formed in a lower portion of the cover means passing through the rod guide tube;
    lubricating oil supply means for supplying lubricating oil to said rod guide tube passing through said passage means; and
    drain means connected to said passage means for returning lubricating oil to said supply means.

2. The bar stock feeder according to claim 1, further comprising a cover tube for covering said rod guide tube, and said moving means is provided on said cover means.

3. The bar stock feeder according to claim 1, wherein said cover means includes a cover tube;
    means rotatably supporting a rod guide assembly within said cover tube;
    said rod guide assembly comprising a plurality of rod guide tubes which are disposed in a circle, and means for rotating said rod guide assembly.

4. The bar stock feeder according to claim 1 wherein said push rod has a rotary push member rotatably mounted in the front end of the push rod so as to be rotated together with a bar stock.

5. The bar stock feeder according to claim 1 wherein said elongated flexible member is a chain, said guide means is a pair of sprocket wheels engaged with the chain, and said means for moving said elongated flexible member is an electric motor.

6. The bar stock feeder according to claim 1 wherein said cover means includes a cover tube and said moving means is provided on said cover tube.

7. The bar stock feeder according to claim 3 further comprising drive means for indexing said rod guide tube assembly so as to position each rod guide tube to a feeding position, and an engaging member secured to said chain so as to engage with said flag at the feeding position.

* * * * *